US007646830B1

(12) United States Patent
Weill

(10) Patent No.: US 7,646,830 B1

(45) Date of Patent: Jan. 12, 2010

(54) COMPLEX MAXIMUM LIKELIHOOD RANGE ESTIMATOR IN A MULTIPATH ENVIRONMENT

(76) Inventor: Lawrence R. Weill, 100 Surf Pl., Seal Beach, CA (US) 90740

( * ) Notice: Subject to any disclaimer, the term of this patent is extended or adjusted under 35 U.S.C. 154(b) by 510 days.

(21) Appl. No.: 11/211,876

(22) Filed: Aug. 26, 2005

(51) Int. Cl.
*H04L 27/06* (2006.01)

(52) U.S. Cl. .................................................... 375/341

(58) Field of Classification Search ................. 375/341, 375/149

See application file for complete search history.

(56) References Cited

U.S. PATENT DOCUMENTS 5,414,729 A * 5/1995 Fenton ....................... 375/149
6,693,592 B2 * 2/2004 Dowdle et al. .............. 342/453

* cited by examiner

*Primary Examiner*—David C Payne
*Assistant Examiner*—Tanmay K Shah

(57) ABSTRACT

In ranging systems such as GPS, radar, and the like, accuracy of the ranging information recovered depends on the phase linearity of the ranging receiver, generally implemented as a superheterodyne radio. Superheterodyne radios use bandpass filters in their Intermediate Frequency (IF) amplifiers to accomplish suppression of adjacent channel signal interference. Depending on the ratio of IF center-frequency to signal-bandwidth, such filters evidence phase non-linearity affecting the signal group delay response. This generally manifests in coupling of the in-phase and quadrature detected signals during signal modulation changes in state. If this effect is ignored, reduced accuracy in the recovery of ranging information can be expected. One solution is to incorporate in the ranging receiver a phase non-linearity compensation structure, but this has an adverse economic impact. On study, it has been determined that real-time Maximum Likelihood estimates of signal parameters in a multipath environment is both tractable and efficacious. The subject of this invention is means to obtain Maximum Likelihood estimates of the amplitude, carrier phase, and delay parameters of the direct and secondary path signals arising in a multipath environment when the receiver signal modulation is complex-valued, an appropriate signal model when phase non-linearity is operating. An algorithmic solution to the problem of ranging receiver induced phase non-linearity is a preferred solution, since there is little to no economic impact.

5 Claims, 3 Drawing Sheets

Showing Operations of the Complex-Valued Multipath Signal Estimator.

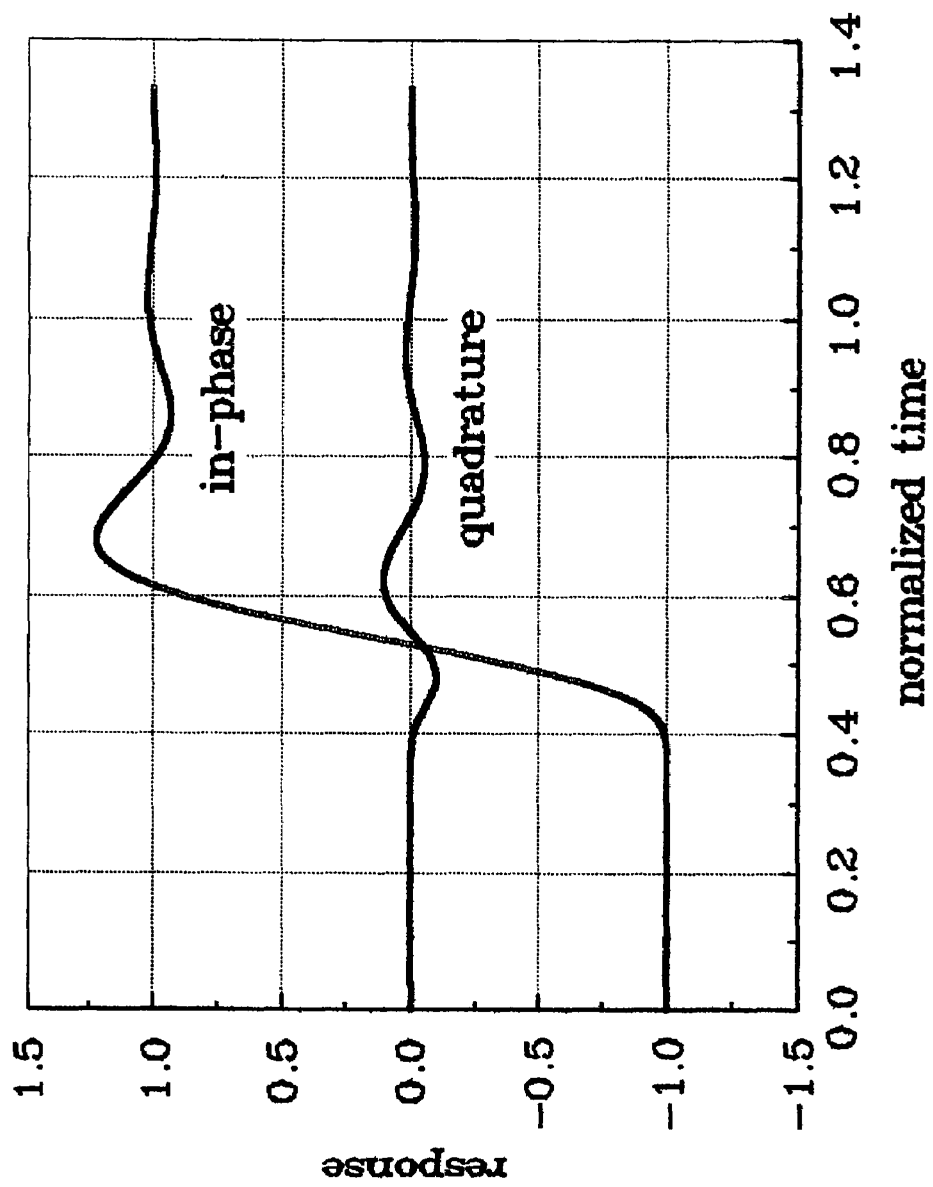
Fig.1a — Showing the Transient Response for Signals Passed Through a Bandpass Filter with Q=2.

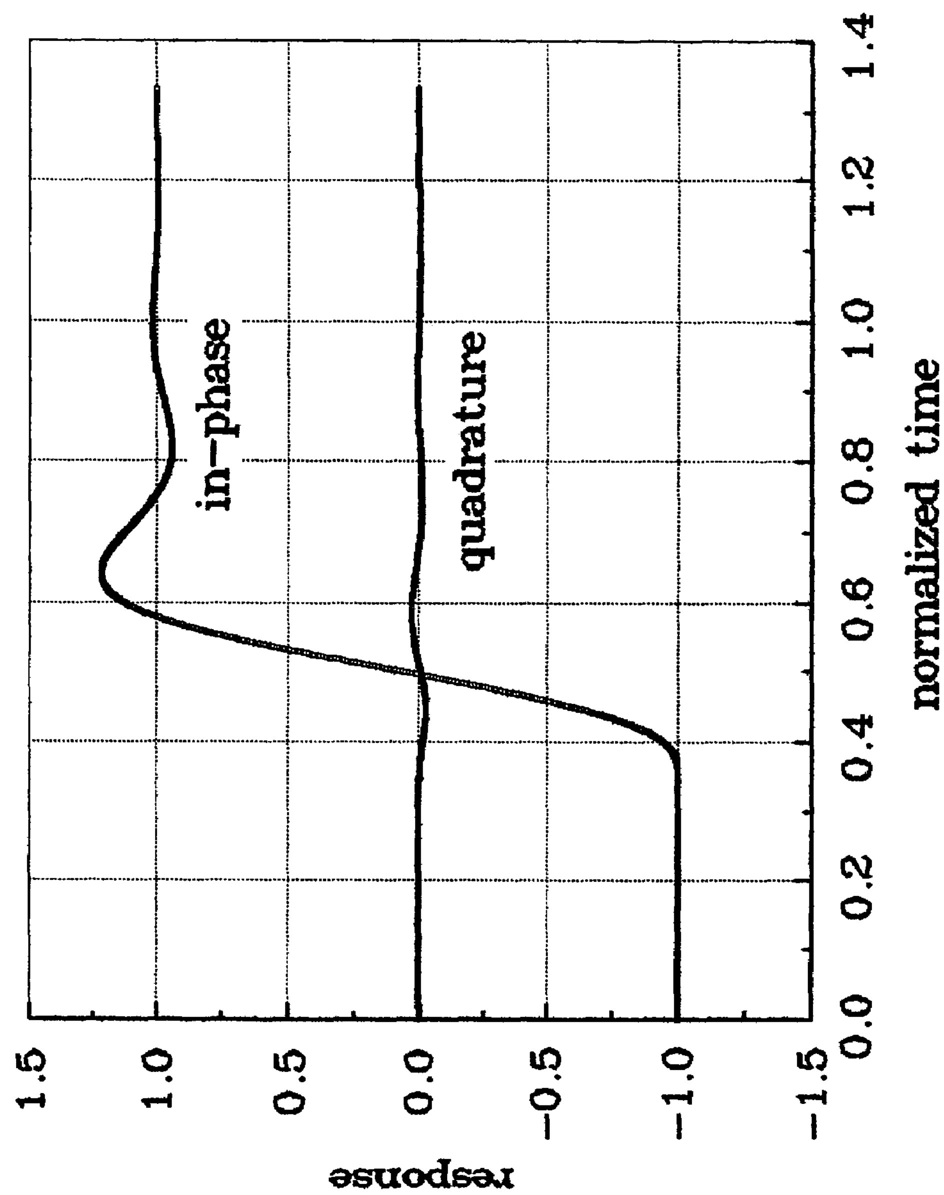
Fig.1b – Showing the Transient Response for Signals Passed Through a Bandpass Filter with Q=8.

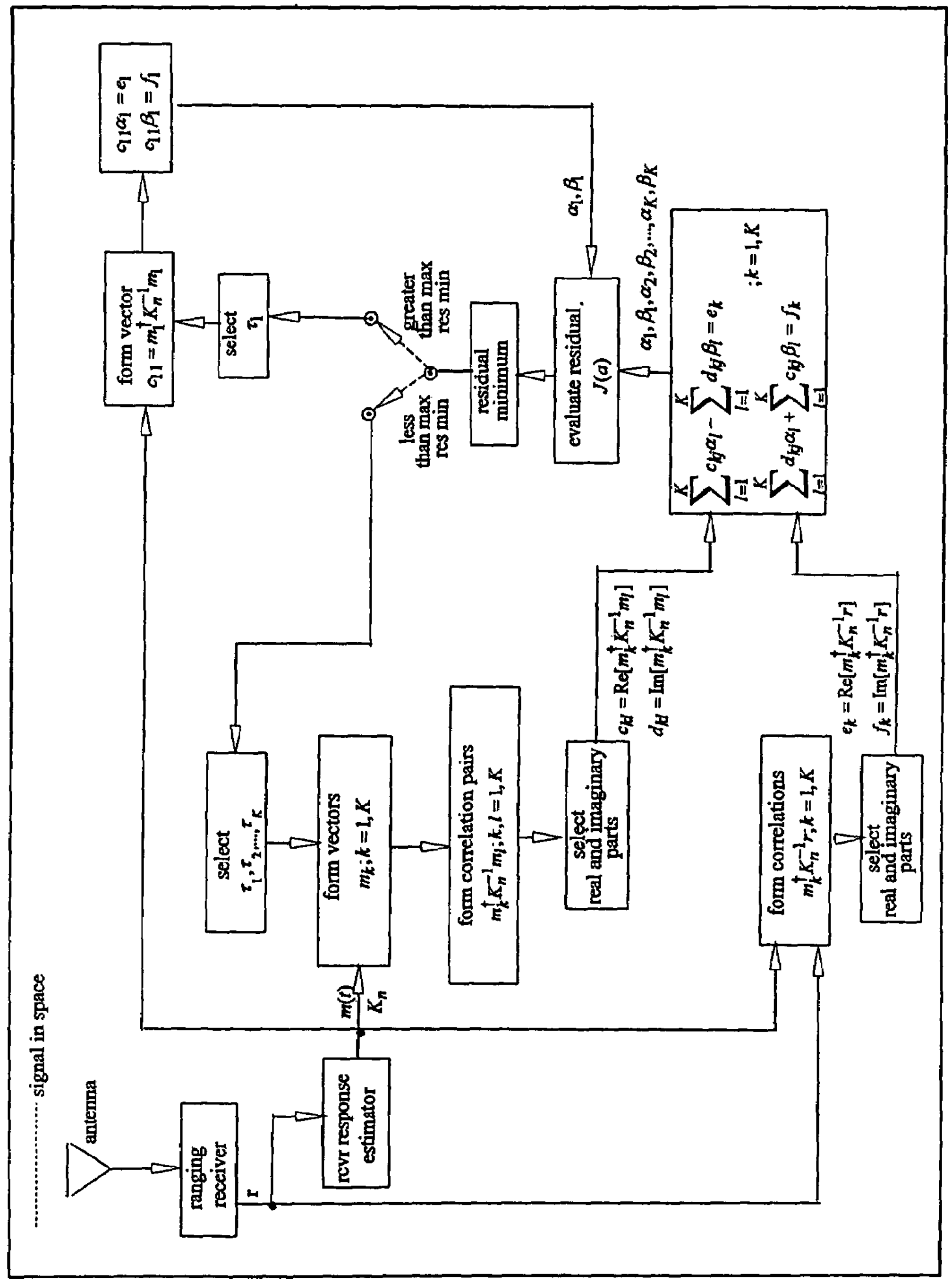
Fig. 2 - Showing Operations of the Complex-Valued Multipath Signal Estimator.

COMPLEX MAXIMUM LIKELIHOOD RANGE ESTIMATOR IN A MULTIPATH ENVIRONMENT

1. FIELD OF THE INVENTION

This invention applies to binary-valued signal modulation ranging systems in which the direct path signal competes with one or more secondary path signals received at the ranging receiver, all of which are processed through a relatively low ratio center-frequency-to-bandwidth Intermediate Frequency (IF) amplifier. Such band-limiting IF amplifiers cause phase distortion, affecting the received signal transient response. Phase correcting filters can be incorporated to compensate for this distortion. In implementations, this is less than desirable since there is an adverse economic impact associated with such structures. This invention algorithmically solves the problem of forming Maximum Likelihood (ML) estimates of the direct and secondary path signal parameters in the case of phase distorted signals, which is a preferred solution since there is then essentially no economic impact. Alternatively, if the IF induced phase distortion is ignored, the signal parameter estimates will be of inferior quality.

Ranging systems such as GPS (Global Positioning System) use signals modulating identical carriers that are mutually in phase quadrature. Receivers can detect such modulation using phase lock loops tracking one or the other carrier phase. With this modulation capability, it is possible to, in effect, transmit ranging signal modulation on two separate channels, although such advanced modulation systems have not yet been described. Without considerations of receiver induced phase distortion processing, these multi-channel ranging signals necessitate the use of the invention here described to obtain best range estimation performance.

BACKGROUND

Ranging receivers generally are designed as superheterodyne radios with one or more Intermediate Frequency (IF) amplifiers. To suppress adjacent channel interference, these IF amplifiers are provided with selectivity accomplished with bandpass filters. Bandpass filters are conventionally characterized by low and high cut-off frequencies, $f_L$ and $f_H$, respectively, defining the bandpass half power response limits. The difference between $f_H$ and $f_L$ is referred to as the filter bandwidth, B. The geometric mean frequency $$\sqrt{f_L f_H}$$

constitutes the filter's center frequency, $f_C$. The ratio of the center frequency to filter bandwidth, $$\frac{f_C}{B},$$

is often referred to as the filter Q-value. When graphed on a linear frequency scale, there will be evidenced non-linearity in the filter phase response. This gives rise to a non-uniform group delay across the response band which affects the receiver's transient response. For a given bandwidth, Q decreases (increases) as $f_C$ decreases (increases). Phase response non-linearity increases as the value of Q decreases due to the increasing departure of $f_C$ from the arithmetic mean frequency $$f_M = \frac{f_L + f_H}{2}.$$

Ranging Receivers

The IF signals of ranging receiver's are often translated to base-band, employing what is referred to as an in-phase and quadrature detector. These are a pair of detectors which use the IF signal center frequency as a reference, generally obtained from the output of a phase lock loop, to coherently detect the IF signal. This is necessary in a ranging receiver to permit an arbitrary received signal carrier phase and to obtain best range estimation performance. Receiver's so configured are often referred to as coherent receivers. The effect of the IF amplifier phase response non-linearity described above is to cross-couple the in-phase and quadrature signals during signal change of state, a phenomenon which does not occur in linear phase systems. FIGS. 1*a* and *b* illustrate the effect.

In ranging systems, signals with relatively large bandwidth are preferred. Ranging accuracy improves as signal bandwidth increases. For reasons of economy and parameter control in receiver embodiments, relatively low center frequency IF amplifiers are preferred. These opposing attributes give rise to ranging receiver embodiments, i.e., low Q, which evidence the phase non-linearity described above. The subject of this invention is means to compensate for these effects algorithmically.

In a multipath environment, the composite signal observed at a ranging receiver antenna can be stated as $$r(t) = \sum_{k=1}^{K} A_K m_T(t - \tau_k)\sin(2\pi(f_C + v_k(t))t + \phi_k) + w(t), \tag{1}$$

where $A_k$ denotes the amplitude of the $k^{th}$=1,K component of the signal received, $m_T(t)$ denotes the transmitted signal modulation, $\tau_k$ denotes the delay from the time of transmission of the $k^{th}$=1,K signal component modulation, $f_C$ denotes the signal carrier frequency, v(t) denotes the carrier Doppler frequency shift (which is generally relatively slowly varying over time) and is assumed here identical for all signal components, $\phi_k$ denotes the phase of the signal carrier of the $k^{th}$=1,K component signal of the received signal, and w(t) denotes zero-mean Gaussian white noise. More generally, interference may also be received, but this is not pertinent to the present discussion.

Assuming the carrier together with the Doppler shift are tracked by a coherent detector phase lock loop, the detection process described above will result in the complex-valued base-band signal $$r_{BB}(t) = \sum_{k=1}^{K} A_k m(t - \tau_k)e^{j\phi_k} + n(t), \tag{2}$$

where n(t) denotes band-limited white Gaussian distributed noise, complex-valued with uncorrelated real and imaginary parts $n_I$ and $n_Q$, respectively, with identical power. Such noise processes are often referred to as circular normal. Each signal modulation function $m(t-\tau_k)$;k=1,K is identically subject to both the band limiting and phase distortion effects of the receiver IF amplifier. Due to the phase non-linearity of the IF filter, the terms $m(t-\tau_k)$; $k^{th}$=1, K can be described by complex-valued functions denoted here with real and imaginary parts $m_I(t-\tau_k)$ and $m_Q(t-\tau_k)$;k=1,K, respectively. In the case where the carrier Doppler shift for the several received signal components is sufficiently different that they must be accounted for, the base-band signal of eq. (2) can be augmented with a Doppler term for each signal component, but this is often unnecessary.

The components of the composite received signal in eq. (2) are not enumerated in any particular order. For ease of discussion and without any loss of generality, let the parameters of the direct path signal component be denoted with the subscript k=1 and the secondary path signal components' parameters with subscripts k=2, . . . , K. Because of the geometry of signal propagation, the delays associated with secondary path signals are never less than that of the direct path signal.

Maximum Likelihood Estimation of Range

Each of the signal components of eq. (2) have three parameters for which there is little to no a priori knowledge: amplitude, delay, and carrier phase, and in a special case not discussed here, carrier Doppler shift. In ranging systems, the focus is on the direct path signal delay, $\tau_1$, constituting the desired ranging information. An optimal, in some sense, estimate of this parameter is sought. All the other signal parameters can be considered a nuisance in respect to this objective; but with an ML estimator, all parameters have equal importance. The ML estimator of signal parameters is a tractable estimator which on study also proves to be efficacious. ML estimates are obtained as the parameter values which maximize the likelihood function, the probability density of the observations conditioned on the unknown signal parameters.

With contemporary receivers, it is the intent following IF detection to further process the base-band signals digitally, for a number of now well understood important reasons. Among these are the ability to execute varied signal and data processing operations, not otherwise feasible. To accomplish this, the signal of eq. (2), which is band limited, is sampled at a high enough rate to avoid what is referred to as aliasing errors, errors caused by overlapping spectral components, an effect routinely encountered in the art. Let $$r=(r_{BB}(t_0),r_{BB}(t_0+1/f_s), \ldots ,r_{BB}(t_0+(N-1)/f_s))^T \quad (3)$$

denote a column vector of samples of $r_{BB}(t)$ taken from arbitrary time $t_0$ to time $t_0+T_o$, where $(N-1)/f_s=T_o$, $T_o$ denoting the signal observation time, and where the superscript T denotes the transpose operator, and also where the sampling rate, $f_s$, is assumed sufficiently high to avoid aliasing errors. Let, also, $$m_k=(m(t_0\tau_k),m(t_0+1/f_s-\tau_k), \ldots , m)(t_0+)(N-1)/f_s-\tau_k))^T \quad (4)$$

denote the column vector of samples of the modulation of the $k^{th}$=1,K signal component of the received signal and, $$n=(n(t_0),n(t_0+1/f_s), \ldots , n(t_0+(N-1)/f_s))^T \quad (5)$$

denote the column vector of samples of the band-limited noise process n(t), both taken at the same rate and over the same time interval as the vector r of eq. (3).

For the signal model of eq. (2), the likelihood function is given by $$P_{r|a} = \frac{1}{|2\pi K_n|^{1/2}} e^{-\left(r-\sum_{k=1}^{K} A_k m_k e^{j\phi_k}\right)^{\dagger} K_n^{-1}\left(r-\sum_{k=1}^{K} A_k m_k e^{j\phi_k}\right)}, \quad (6)$$

where $K_n$ denotes the matrix of covariances of the vector of noise samples n, a denotes the vector of signal parameters $A_1$, $\tau_1$, $\phi_1$, $A_2$, $\tau_2$, $\phi_2$, . . . , $A_K$, $\tau_K$, $\phi_K$, where the delay parameters are embedded in the signal modulation functions $m_k$; k=1,K as described above, and where the superscript dagger, †, denotes the conjugate transpose operator. Since the coefficient $$\frac{1}{|2\pi K_n|^{1/2}}$$

is independent of the parameters a, the ML estimate of a, $\hat{a}_{ML}$, is given by $$\hat{a}_{ML} = \max_a\left[-\left(r-\sum_{k=1}^{K} A_k m_k e^{j\phi_k}\right)^{\dagger} K_n^{-1}\left(r-\sum_{k=1}^{K} A_k m_k e^{j\phi_k}\right)\right], \quad (7)$$

which is equivalent to finding the set of parameter values $\hat{a}_{ML}$ that minimize $$J(a) = \left(r-\sum_{k=1}^{K} A_k m_k e^{j\phi_k}\right)^{\dagger} K_n^{-1}\left(r-\sum_{k=1}^{K} A_k m_k e^{j\phi_k}\right), \quad (8)$$

a quantity often referred to as the residual.

Based on the properties of circular normal variates, it can be seen that the covariance matrix, $K_n$, of the noise vector, n, is real-valued and symmetric. Therefore, the inverse matrix, $K_n^{-1}$, is also real-valued and symmetric.

2. DESCRIPTION OF RELATED ART

The problem of finding the set of parameters, $\hat{a}_{ML}$, nominally involves evaluating the residual over 3K unknowns in a search process, where, on successive iterations of the search process, the unknowns are selected with sufficiently fine resolution to permit identifying the minimum residual. Not including results which follow from this invention, even if K=2, corresponding to a single secondary path signal, this is a sufficiently formidable computational task that ML estimation of range when multipath is present in the signal observations is essentially impractical of accomplishing in real time. Prior art on this subject consists of two works. The earliest is the work by R. D. J. Van Nee described in U.S. Pat. No. 5,615,232 and entitled "Method of Estimating a Line of Sight Signal Propagation Time Using a Reduced Multipath Correlation Function." Van Nee first forms the cross correlation function of the received signal with the a priori known signal modulation generated by the receiver. On successive estimates of the then remaining most intense secondary path signal parameters, this correlation function is reduced by the contribution of that secondary path signal. This is repeated to convergence, i.e., when it is determined that there is no additional secondary path signal remaining, so that at convergence the residual correlation function is that of the direct path signal with the known modulation. The range information desired is the location of the peak of that function. Later, Weill and Fisher described in U.S. Pat. No. 6,370,207 entitled "Method for Mitigating Multipath Effects in Radio Systems" a computationally practical method for the real-time computation of ML estimates of range and the nuisance parameters associated with multipath received signals. Their method involves the reduction of the search dimension to K unknowns and in the cited U.S. patent assumed the received signal modulation function at base-band is real-valued. This is not applicable in the instances of phase non-linearity addressed here.

3. OBJECTS AND SUMMARY OF THE INVENTION

The prior art on the subject of Maximum Likelihood estimation of range when multipath is present in the signal observations does not address the case of complex-valued signal modulation. This is not unimportant since in the practice of the art, it is preferred to design ranging receivers with relatively low center frequency Intermediate Frequency amplifiers for the sake of economy; in spite of the fact that the ranging system requires relatively wide bandwidth modulation to achieve the desired ranging accuracy. These low Q IF amplifiers produce non-linearity in signal phase resulting in cross-coupling between the in-phase and quadrature detected signals during occurrences of signal modulation transitions, already described.

The penalty for not taking into account the cross-coupled signal model evidenced with low Q IF amplifiers is a significant loss of accuracy. High accuracy is the principal motivation for the use of the ML estimator. The objective of this invention is to provide the machinery and method needed to obtain ML estimates of signal parameters where one or more secondary path signals compete with the direct path signal received, in the instance where phase non-linearity in the processing of received signals is encountered, or where multi-channel ranging is in operation.

More specifically, the invention provides a method of linearizing the residual function in the non-delay parameters of the observed direct path and secondary path signals in a ranging receiver in which phase non-linearity is operating. It provides the coefficients of a set of 2K linear equations in those parameters as the real and imaginary parts of the noise weighted signal modulation cross-correlations $m_k^\dagger K_n^{-1} m_l$;k, l=1,K of the vector of samples of the a priori known signal modulation functions, m(t), where $\tau_k$ and $\tau_l$ are the values of the estimated delay of the k,$l^{th}$=1,K pair of the $K^2$ pairs of observed signals. It provides a procedure for sequentially searching for the ML estimates of signal delays where on each iteration of the search process, the linearized equivalent nuisance parameters are determined. These are used to evaluate the residual for that set of estimated delays. The process converges at the smallest value of residual. Finally, it provides a procedure for obtaining ML estimates of the direct path signal delay when the secondary path signals are near the delay of the secondary path signal where the solutions for the linearized signal nuisance parameters are not numerically stable.

BRIEF DESCRIPTION OF THE DRAWINGS

FIGS. 1*a,b*—Showing the Transient Response for Signals Passed Through Filters of Q=2 and Q=8.

FIG. 2—Showing Operations of the Complex-Valued Multipath Signal Estimator.

DESCRIPTION OF THE PREFERRED EMBODIMENT

The Nuisance Parameters

By replacing the polar quantities $A_k e^{j\phi_k}$;k=1, K with their Cartesian equivalents $$A_k e^{j\phi_k} = \alpha_k + j\beta_k; k=1,K, \tag{9}$$

where $\alpha_k = A_k\cos(\phi_k)$ and $\beta_k = A_k\sin(\phi_k)$, the residual of eq. (8) can be restated as $$J(a) = \left(r - \sum_{l=1}^{K}(\alpha_l + j\beta_l)m_l\right)^\dagger K_n^{-1}\left(r - \sum_{l=1}^{K}(\alpha_l + j\beta_l)m_l\right). \tag{10}$$

At either a maximum or a minimum extremal of J(a), the partial derivatives of J(a)with respect to $\alpha_k$ and $\beta_k$; k=1,K be zero. The partial derivative of J(a) with respect to $\alpha_k$, for any k=1,K, is given by $$\frac{\partial J(a)}{\partial \alpha_k} = \left[r - \sum_{l=1}^{K}(\alpha_l + j\beta_l)m_l\right]^\dagger K_n^{-1}(-m_k) - m_k^\dagger K_n^{-1}\left[r - \sum_{l=1}^{K}(\alpha_l + j\beta_l)m_l\right] = -\left(r^\dagger K_n^{-1}m_k + m_k^\dagger K_n^{-1}r\right) + \sum_{l=1}^{K}\alpha_l\left(m_k^\dagger K_n^{-1}m_l + m_l^\dagger K_n^{-1}m_k\right) + j\sum_{l=1}^{K}\beta_l\left(m_k^\dagger K_n^{-1}m_l - m_l^\dagger K_n^{-1}m_k\right), \tag{11}$$

which is a linear equation in $\alpha_l$ and $\beta_l$;l=1,K. With $v_k$;k=1,K denoting a set of vectors, the term $v_k^\dagger K_n^{-1} v_l$ is sometimes referred to as the noise-weighted cross-correlation of the vectors $v_k$ and $v_l$. If l=k, then that term is referred to as the noise-weighted autocorrelation of $v_k$.

The terms $r^\dagger K_n^{-1} m_k$ and $m_k^\dagger K_n^{-1} r$ of eq. (11) are complex conjugate pairs, as are the terms $m_k^\dagger K_n^{-1} m_l$ and $m_l^\dagger K_n^{-1} m_k$. The sum of two complex conjugates is equal to twice the real part of either. The difference of two complex conjugates is j=$\sqrt{-1}$ times twice the imaginary part of the minuend (leading term). Therefore, $$\frac{\partial J(a)}{\partial \alpha_k} = -2\mathrm{Re}\left[m_k^\dagger K_n^{-1}r\right] + 2\sum_{l=1}^{K}\alpha_l\mathrm{Re}\left[m_k^\dagger K_n^{-1}m_l\right] - 2\sum_{l=1}^{K}\beta_l\mathrm{Im}\left[m_k^\dagger K_n^{-1}m_l\right], \tag{12}$$

where Re[•] and Im[•] denote the real and imaginary parts, respectively, of the quantities in the brackets.

Similarly, the partial derivative of J(a) with respect to any $\beta_k$;k=1,K is given by $$\frac{\partial\lambda(a)}{\partial\beta_k} = \left(r - \sum_{l=1}^{K}(\alpha_l + j\beta_l)m_l\right)^\dagger K_n^{-1}(-jm_k) + (jm_k^\dagger)K_n^{-1}\left(r - \sum_{l=1}^{K}(\alpha_l + j\beta_l)m_l\right) = j(m_k^\dagger K_n^{-1}r - r^\dagger K_n^{-1}m_k) - j\sum_{l=1}^{K}\alpha_l(m_k^\dagger K_n^{-1}m_l - m_l^\dagger K_n^{-1}m_k) + \sum_{l=1}^{K}\beta_l(m_k^\dagger K_n^{-1}m_l + m_l^\dagger K_n^{-1}m_k). \tag{13}$$

Hence, $$\frac{\partial J(a)}{\partial\beta_k} = -2\mathrm{Im}(m_k^\dagger K_n^{-1}r) + 2\sum_{l=1}^{K}\alpha_l\mathrm{Im}[m_k^\dagger K_n^{-1}m_l] + 2\sum_{l=1}^{K}\beta_l\mathrm{Re}[m_k^\dagger K_n^{-1}m_l]. \tag{14}$$

Equating the partials of eqs. (12) and (14) to zero results in the set of 2K equations linear in the quantities $\alpha_l$ and $\beta_l$;l=1,K $$\sum_{l=1}^{K}\alpha_l\mathrm{Re}[m_k^\dagger K_n^{-1}m_l] - \sum_{l=1}^{K}\beta_l\mathrm{Im}[m_k^\dagger K_n^{-1}m_l] = \mathrm{Re}[m_k^\dagger K_n^{-1}r];\quad k = 1, K, \tag{15a, b}$$

$$\sum_{l=1}^{K}\alpha_l\mathrm{Im}[m_k^\dagger K_n^{-1}m_l] + \sum_{l=1}^{K}\beta_l\mathrm{Re}[m_k^\dagger K_n^{-1}m_l] = \mathrm{Im}[m_k^\dagger K_n^{-1}r];\quad k = 1, K.$$

The coefficients of the $\alpha_l$'s and $\beta_l$'s in eqs. (15a,b), which are $4K^2$ in number, are given by the real and imaginary parts of the noise weighted correlations $m_k^\dagger K_n^{-1}m_l$;k,l=1,K and $m_k^\dagger K_n^{-1}r$;k=1,K. Since $$m_k^\dagger K_n^{-1}m_l = (m_{kI} + jm_{kQ})^\dagger K_n^{-1}(m_{lI} + jm_{lQ}) = m_{kI}^T K_n^{-1}m_{lI} + m_{kQ}^T K_n^{-1}m_{lQ} + j(m_{kI}^T K_n^{-1}m_{lQ} - m_{kQ}^T K_n^{-1}m_{lI}), \tag{16}$$

it follows that $$\mathrm{Re}[m_k^\dagger K_n^{-1}m_l] = m_{kI}^T K_n^{-1}m_{lI} + m_{kQ}^T K_n^{-1}m_{lQ},\quad \mathrm{Im}[m_k^\dagger K_n^{-1}m_l] = m_{kI}^T K_n^{-1}m_{lQ} - m_{kQ}^T K_n^{-1}m_{lI}. \tag{17a, b}$$

Similarly, $$\mathrm{Re}[m_k^\dagger K_n^{-1}r] = m_{kI}^T K_n^{-1}r_I + m_{kQ}^T K_n^{-1}r_Q,\quad \mathrm{Im}[m_k^\dagger K_n^{-1}r] = m_{kI}^T K_n^{-1}r_Q - m_{kQ}^T K_n^{-1}r_I. \tag{18a, b}$$

Methods for solving the set of linear eqs. (15a,b) for the unknowns $\alpha_l$, $\beta_l$;l=1,K are well known. For example, if M represents a 2K by 2K matrix and if x represents a set of 2K unknowns, then with y denoting a 2K vector of knowns, the solution of Mx=y is given by $x=M^{-1}y$, assuming M is invertible, where $M^{-1}$ is the matrix inverse of M. Alternatively, such other methods for solving systems of linear equations as Gaussian reduction can also be used.

Methods of forming the noise weighted correlations of eq. (10) include averaging samples of the baseband signal modulation function m(t) produced on repetitive outputs of the ranging receiver and interpolating the results. Methods for estimating the covariance of the ranging receiver noise, including the use of the FFT algorithm, are well understood in the art.

Invertibility of the $\alpha_l$'s and $\beta_l$'s

Given the correlation quantities of eqs. (17a,b) and (18a,b), the system of linear equations (15a,b) can most generally be solved for the quantities $\alpha_l$, $\beta_l$;l=1,K. The corresponding signal parameters are given by the inversion equations $$A_l = \sqrt{a_l^2 + \beta_l^2};\ l = 1, K, \tag{19a}$$

and $$\phi_l = a\ \tan\ 2\left(\frac{\beta_l}{\alpha_l}\right);\ l = 1, K, \tag{19b}$$

where a tan 2(•) is defined as the four quadrant inverse tangent function.

Illustration of the Linear Equations (15,a,b) in the Case where K=2

In the special, but important, case of K=2, arising where there is observed a direct path signal and one secondary path signal, eqs. (15a,b) are given by $$\mathrm{Re}[m_1^\dagger K_n^{-1}m_1]\alpha_1 + \mathrm{Re}[m_1^\dagger K_n^{-1}m_2]\alpha_2 - \mathrm{Im}[m_1^\dagger K_n^{-1}m_1]\beta_1 - \mathrm{Im}[m_1^\dagger K_n^{-1}m_2]\beta_2 = \mathrm{Re}[m_1^\dagger K_n^{-1}r], \tag{20a, b, c, d}$$

$$\mathrm{Re}[m_2^\dagger K_n^{-1}m_1]\alpha_1 + \mathrm{Re}[m_2^\dagger K_n^{-1}m_2]\alpha_2 - \mathrm{Im}[m_2^\dagger K_n^{-1}m_1]\beta_1 - \mathrm{Im}[m_2^\dagger K_n^{-1}m_2]\beta_2 = \mathrm{Re}[m_2^\dagger K_n^{-1}r],$$

$$\mathrm{Im}[m_1^\dagger K_n^{-1}m_1]\alpha_1 + \mathrm{Im}[m_1^\dagger K_n^{-1}m_2]\alpha_2 + \mathrm{Re}[m_1^\dagger K_n^{-1}m_1]\beta_1 + \mathrm{Re}[m_1^\dagger K_n^{-1}m_2]\beta_2 = \mathrm{Im}[m_1^\dagger K_n^{-1}r],$$

$$\mathrm{Im}[m_2^\dagger K_n^{-1}m_1]\alpha_1 + \mathrm{Im}[m_2^\dagger K_n^{-1}m_2]\alpha_2 + \mathrm{Re}[m_2^\dagger K_n^{-1}m_1]\beta_1 + \mathrm{Re}[m_2^\dagger K_n^{-1}m_2]\beta_2 = \mathrm{Im}[m_2^\dagger K_n^{-1}r].$$

The coefficients $c_{12}=\mathrm{Re}[m_1^\dagger K_n^{-1}m_2]$ and $c_{21}=\mathrm{Re}[m_2^\dagger K_n^{-1}m_1]$ of these equations are equal since the quantities within the brackets are conjugate pairs, and hence their real parts are equal. In the instance where $\tau_2$ is nearly equal to $\tau_1$, $c_{12}=\mathrm{Re}[m_1^\dagger K_n^{-1}m_2]$ is nearly equal to $c_{11}=\mathrm{Re}[m_1^\dagger K_n^{-1}m_1]$, so that the coefficients $c_{11}$,$c_{12}$, $c_{21}$ and $c_{22}$ are all nearly equal. Since the quantities $m_{1I}^T K_n^{-1}m_{1Q}$ and $m_{1Q}^T K_n^{-1}m_{1I}$ are equal, and since $m_{2I}^T K_n^{-1}m_{2Q}=m_{2Q}^T K_n^{-1}m_{2I}$, the coefficients $c_{31}=\mathrm{Im}[m_1^\dagger K_n^{-1}m_1]=m_{1I}^T K_n^{-1}m_{1Q}-m_{1Q}^T K_n^{-1}m_{1I}$ and $c_{42}=\mathrm{Im}[m_2^\dagger K_n^{-1}m_2]=m_{2I}^T K_n^{-1}m_{2Q}-m_{2Q}^T K_n^{-1}m_{2I}$ are equal to zero. Further, the coefficients $c_{32}$ and $c_{41}$ are conjugate pairs. In the instance where $\tau_2$ is nearly equal to $\tau_1$, the coefficients $c_{32}$ and $c_{31}$ are nearly the same value, zero. Thus, column 2 of the set of eqs. (20,a,b,c,d) and column 1 are nearly equal. If any two columns (or rows) of a set of linear equations are equal or otherwise linearly dependent, the matrix is singular (non-invertible), which means there is no unique solution of the set of equations. A matrix in which two columns (or rows) are nearly equal is said to be ill-conditioned, which can be quantified in terms of an ill-conditioning number. As the ill-conditioning number increases, the closer the matrix is to singular. In the case of a large ill-conditioning number, the solutions will generally evidence large numerical errors, and in that case the values for the residual J(a) obtained using those solutions will most generally be unusually large, and therefore non-admissable solutions.

In the special case where K=1, no such ill-conditioning occurs. For K=1, terms involving $\mathrm{Im}[m_1^{\dagger}K_n^{-1}m_1]$ disappear since the quantity $m_1^{\dagger}K_n^{-1}m_1$ is real valued, so that eqs. (15a,b) reduce to $$\mathrm{Re}\left[m_1^{\dagger}K_n^{-1}m_1\right]\alpha_1 = \mathrm{Re}\left[m_1^{\dagger}K_n^{-1}r\right], \tag{21a}$$

$$\mathrm{Re}\left[m_1^{\dagger}K_n^{-1}m_1\right]\beta_1 = \mathrm{Im}\left[m_1^{\dagger}K_n^{-1}r\right], \tag{21b}$$

from which it is easy to conclude that it is not possible for eqs. (21a,b) to be ill-conditioned. This guarantees a numerically stable solution for the case of no multipath. Physically, in the multiple secondary path cases, if the estimated delays $\tau_2$ through $\tau_K$ are near in value to $\tau_1$, the Maximum Likelihood estimation problem collapses to the estimates of the parameters of a single path signal, or at least is well approximated by a single path estimation problem.

In the case where the receiver receives a single signal, i.e., the direct path signal, J(a) has an expectation, or equivalently, mean or average value given by $$E[J(a)] = A_1^2 m_1^{\dagger}K_n^{-1}m_1 + N - \frac{Tr\left[K_n^{-1}m_1m_1^{\dagger}\right]}{m_1^{\dagger}K_n^{-1}m_1}, \tag{22}$$

where Tr[•] denotes the trace of the matrix in the brackets. This expression can be used to assess when, due to numerical instability, J(a) is too large to be admissable as a valid evaluation of the residual.

Delay Parameters

Assume that for any ranging receiver, the signal modulation response and the receiver noise are observed, so that both the complex-valued modulation waveform m(t) and the noise covariance matrix are known a priori to an acceptable level of uncertainty. The process then for determining the ML estimates of the signal parameter vector $a=A_1, \tau_1, \phi_1, A_2, \tau_2, \phi_2, \ldots, A_K, \tau_K, \phi_K$ consists of the following operations (the reader may opt to follow these steps displayed in the flow chart of FIG. 2):

1) Select a set of K delay values $\tau_1, \tau_2, \ldots, \tau_K$.

2) Using the a priori known waveform m(t), form the vectors $m(t_n-\tau_k)$;n=0, N−1;k=1,K.

3) Form the $K^2$ correlation pairs $$c_{kl} = \sum_{m=0}^{N-1} m^{\dagger}(t_m-\tau_k)K_n^{-1}(m,m)m(t_m-\tau_l);$$

k,l=1,K, where $K_n^{-1}(m,m)$ is the $m^{th}$ diagonal element of $K_n^{-1}$.

4) Determine the real and imaginary parts of the set of $K^2$ complex-valued coefficients $c_{kl}$;k,l=1,K.

5) On observing r, form the K correlations $$R_k = \sum_{m=0}^{N-1} m^{\dagger}(t_m-\tau_k)K_n^{-1}(m,m)r(t_m);\ k=1,K.$$

6) Determine the real and imaginary parts of the set $R_k$;k=1, K.

7) Insert into the system of eqs. (15a,b) the coefficients determined in steps 4) and 6).

8) Solve the system of eqs. (15,a,b) for the 2K quantities $\alpha_k$, $\beta_k$;k=1,K.

9) Using the results of steps 2) and 8) evaluate J(a) of eq. (10) and note the result.

10) Select another set of delays $\tau_1, \tau_2, \ldots, \tau_K$ and repeat steps 2) through 9) until a minimum in J(a) is obtained. If that value of J(a) is greater than a precalibrated value, skip to step 12). If not, then 11) associated with the minimum value of J(a) determined in step 10 is a specific set of delays. Associated with those delays is a specific set of the quantities $\alpha_k$ and $\beta_k$;k=1,K obtained through the set of linear eqs. (15a,b). The inverse of those linearized nuisance parameter values together with the set of delays that gave rise to those values are the ML estimates desired.

12) In the case where J(a) determined in step 10 is greater than a precalibrated value, select a value of $\tau_1$, determine $\alpha_1$ and $\beta_1$ from eqs. (21a,b), and evaluate J(a) of eq. (10). Repeat this process until a minimum value for J(a) is found. Accept the delay and the direct path nuisance parameters, amplitude and phase, obtained from inversions of the solution of eqs. (21a,b) as the ML estimates of the direct path signal parameters.

I claim:

1. A process for obtaining Maximum Likelihood estimates of the parameters of the direct and secondary path signals observed in a ranging system when the system introduces phase non-linearity, comprising the steps of:

receiving a transmitted direct path signal also including, possibly, secondary path signals which are arbitrary in number, all of which are processed through a low Q bandpass filter introducing phase non-linearity, and translating the composite signal to a baseband signal;

sampling that baseband signal over a finite interval of time, thereby creating a sampled baseband signal vector;

selecting a set of delay values as estimates of the observed direct and secondary paths signals' delays;

forming the vector of samples of the signal modulation functions corresponding to the direct and each secondary path signal delay selected;

determining the noise weighted correlations of the aforesaid modulation functions and selecting their real and imaginary parts;

determining the real and imaginary parts of the noise weighted correlation of these modulation functions and the received signal; and solving a set of linear equations for a set of transformed signal parameters using the real and imaginary parts so obtained as coefficients of that set of equations;

evaluating the likelihood function residual obtained with that set of transformed signal parameters;

repeating the steps of selecting a set of signal delays estimates, determining the signal modulation correlation values, using their real and imaginary parts as coefficients of a set of linear equations, together with the real and imaginary parts of the noise weighted modulation and received signal correlation, and solving that set of equations;

using the linearized parameter values so obtained as solutions to that set of equations, and evaluating the likelihood residual with that solution set, terminating this iterative process when a minimum in the residual is obtained;

either accepting the values of signal delay and the transformed linearized signal parameters as Maximum Likelihood estimates of those parameters, or, if the likelihood residual corresponding to those values is unusually large, then select a single value of delay and using the real and imaginary parts of the noise weighted correlation of the signal modulation function and the noise weighted modulation and received signal correlation obtained with this delay, as coefficients in a set of two equations, solve for the transformed amplitude and phase of the single signal corresponding to the single value of delay, and evaluate the likelihood residual obtained with the single signal transformed parameters so obtained, and repeat this process until a minimum value of the likelihood residual is obtained; and accept the value of delay and inverted linearized signal parameters obtained as Maximum Likelihood estimates of the direct path signal parameters;

including the formation of the set of vectors $$m_k=(m(t_0-\tau_k),m(t_0+1/f_s-\tau_k),\ \dots,\ m(t_0+(N-1)/f_s-\tau_k))^T;\quad k=1,K, \tag{1}$$

where $m(t)$ is the a priori known baseband complex-valued ranging receiver's response to the signal modulation function, $t_0$ is an arbitrary time, and the sampling rate, $f_s$, is sufficiently high that no appreciable signal aliasing-occurs, and where $\tau_1, \tau_2, \dots, \tau_K$ is a set of selected signal delays estimating the delay of the direct and secondary path signals observed;

including the formation of the correlation coefficients $c_{kl}=m_k^1K_n^{-1}m_l$, for k,l=1,K, and $R_k=m_k^\dagger K_n^{-1}r$, for k=1, K, where $K_n^{-1}$ represents the a priori determined inverse of the noise covariance matrix of the vector of noise samples produced by the ranging receiver, and r represents the vector of samples of the ranging receiver's baseband composite signal observed.

2. The processes as in claim 1 including the formation of the set of equations $$\sum_{l=1}^{K}\alpha_l\mathrm{Re}\left[m_k^\dagger K_n^{-1}m_l\right]-\sum_{l=1}^{K}\beta_l\mathrm{Im}\left[m_k^\dagger K_n^{-1}m_l\right]=\mathrm{Re}\left[m_k^\dagger K_n^{-1}r\right];\quad k=1,K,$$

$$\sum_{l=1}^{K}\alpha_l\mathrm{Im}\left[m_k^\dagger K_n^{-1}m_l\right]+\sum_{l=1}^{K}\beta_l\mathrm{Re}\left[m_k^\dagger K_n^{-1}m_l\right]=\mathrm{Im}\left[m_k^\dagger K_n^{-1}r\right];\quad k=1,K, \tag{2a, b}$$

and the solution of this set of equations for the 2K linearized signal parameters $\alpha_k$, $\beta_k$;k=1,K.

3. The processes as in claim 2 including the evaluation of the likelihood function residual $$J(a)=\left(r-\sum_{k=1}^{K}(\alpha_k+j\beta_k)m_k\right)^\dagger K_n^{-1}\left(r\sum_{k=1}^{K}(\alpha_k+j\beta_k)m_k\right). \tag{3}$$

4. The repetition of steps in claim 1 until a minimum value of J(a) is obtained, and if that minimum value is not larger than anticipated, accept the set of delays corresponding to that minimum value of J(a) and the signal parameters obtained from inverting the set $\alpha_k$, $\beta_k$;k=1,K obtained as the solution to eq. (2a,b) using the inversion formulas $$A_k=\sqrt{a_k^2+\beta_k^2};\ k=1,K, \tag{4a}$$

$$\phi_k=a\tan 2\left(\frac{\beta_k}{\alpha_k}\right);\ k=1,K. \tag{4b}$$

5. The process of claim 4, where if the minimum value of J(a) is larger than anticipated, select a single delay estimate $\tau_1$, form the delayed signal modulation function vector $m_1=(m(t_0-\tau_1),m(t_0+1/f_s-\tau_1),\ \dots,\ m(t_0+(N-1)/f_s-\tau_1))^T$ and the noise weighted correlations $m_1^\dagger K_n^{-1}m_1$ and $m_1^\dagger K_n^{-1}r$. Use those correlation value as the coefficients in the pair of equations $$Re[m_1^\dagger K_n^{-1}m_1]\alpha_1=Re[m_1^\dagger K_n^{-1}r], \tag{5a}$$

$$Re[m_1^\dagger K_n^{-1}m_1]\beta_1=Im[m_1^\dagger K_n^{-1}r] \tag{5b}$$

to solve for $\alpha_1$ and $\beta_1$. Use these values and the vector $m_1$ and matrix $K_n^{-1}$ to evaluate $$J(a)=(r-)(\alpha_1+j\beta_1)m_1)^\dagger K_n^{-1}(r-(\alpha_1+j\beta_1)m_1). \tag{6}$$

Repeat this process until a minimum value of J(a) is obtained and accept the value of delay estimate corresponding to this minimum value as the Maximum Likelihood estimate of $\tau_1$ and the values of the inverted signal parameters, $A_1$, $\phi_1$, corresponding to $\alpha_1$ and $\beta_1$ obtained with this delay estimate.

* * * * *